Figure 1:
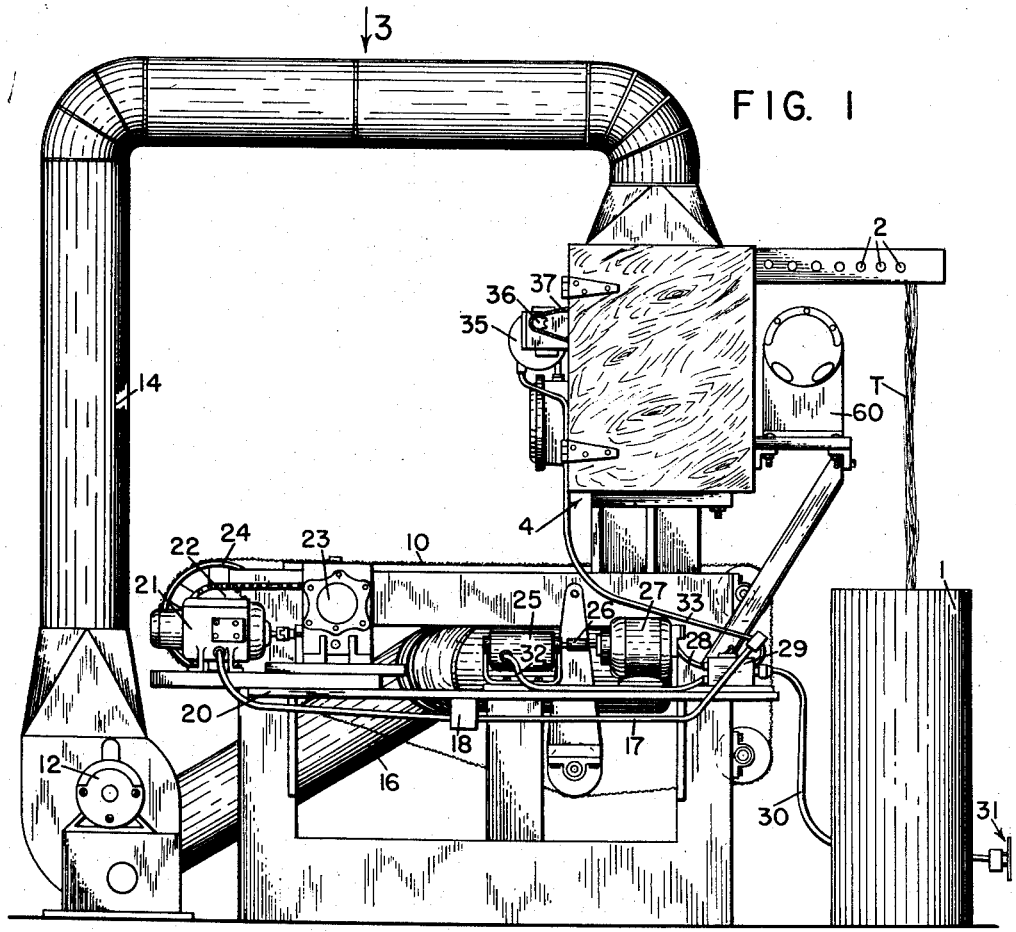

Jan. 8, 1963 T. T. CONSTANTINE ETAL 3,071,821
METHOD OF PRODUCING DISCONTINUOUS FIBERS FROM CONTINUOUS
FILAMENTS INCIDENT TO FORMING A NONWOVEN WEB
Filed June 10, 1960 5 Sheets-Sheet 1

INVENTORS
THOMAS T. CONSTANTINE
RICHARD D. WELLS

*Charles T. Hawley*
ATTORNEY

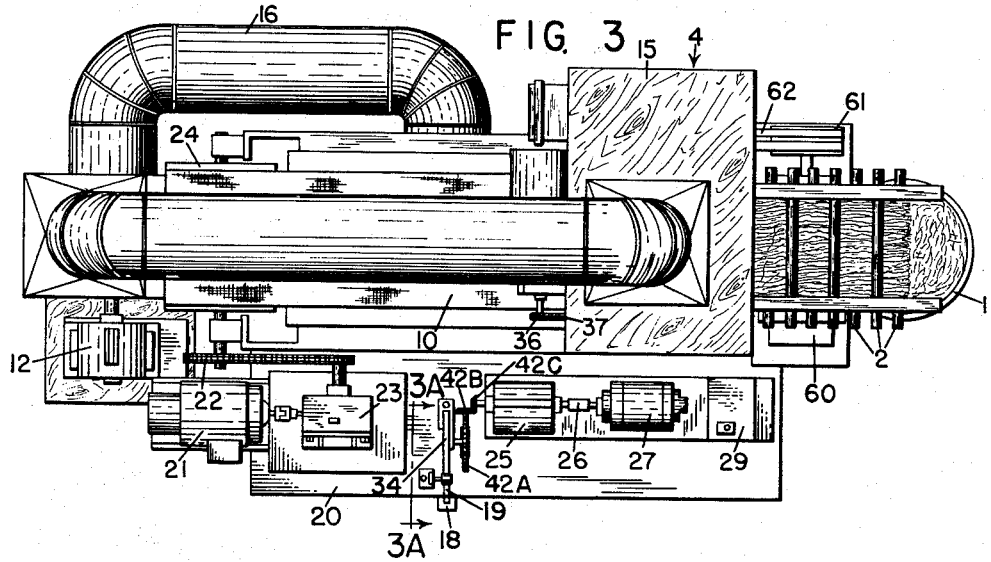
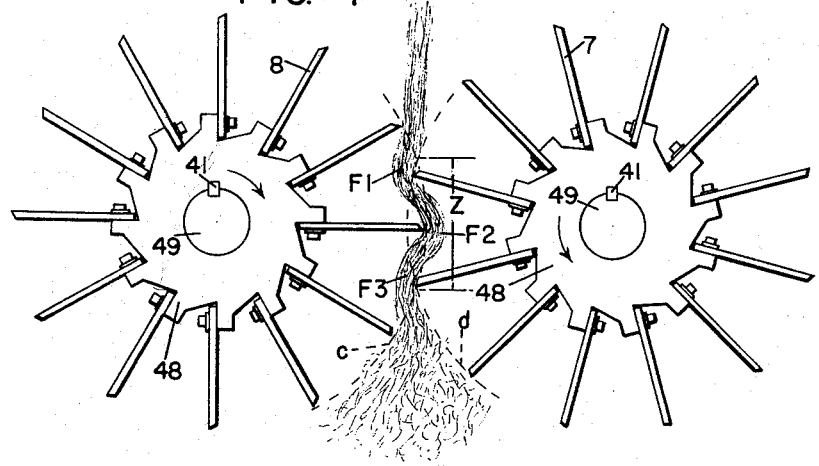
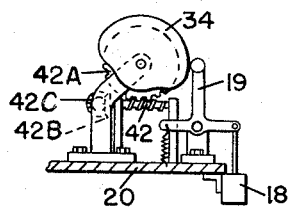
INVENTORS
THOMAS T. CONSTANTINE
RICHARD D. WELLS
Charles T. Hawley
ATTORNEY Jan. 8, 1963 T. T. CONSTANTINE ETAL 3,071,821
METHOD OF PRODUCING DISCONTINUOUS FIBERS FROM CONTINUOUS
FILAMENTS INCIDENT TO FORMING A NONWOVEN WEB
Filed June 10, 1960 5 Sheets-Sheet 3

INVENTORS
THOMAS T. CONSTANTINE
RICHARD D. WELLS

Charles T. Hawley
ATTORNEY

INVENTORS
THOMAS T. CONSTANTINE
RICHARD D. WELLS

Charles T. Hawley

ATTORNEY

United States Patent Office 3,071,821
Patented Jan. 8, 1963

3,071,821
METHOD OF PRODUCING DISCONTINUOUS FIBERS FROM CONTINUOUS FILAMENTS INCIDENT TO FORMING A NONWOVEN WEB
Thomas T. Constantine, South Easton, and Richard D. Wells, Westwood, Mass., assignors to Crompton & Knowles Corporation, Worcester, Mass., a corporation of Massachusetts
Filed June 10, 1960, Ser. No. 35,157
10 Claims. (Cl. 19—155)

This invention relates to a nonwoven textile product and the mechanism and method for producing it.

Most commercially available nonwoven webs and fabrics consist for the most part of pre-cut commercial staple fiber which must be opened, blended (if required) and then, depending upon the particular process involve, this fiber must be distributed upon a collector or conveyor such as will form a linear sheet-like material.

Much of the equipment used to produce nonwoven material today is merely cotton and woolen converting equipment which has been slightly modified to suit the purpose. Specifically, carding and garnetting machines are utilized to the greatest extend. Due to certain inherent properties of these machines an oriented type web is produced at the sacrifice of a certain quality, usually referred to as randomness, which contributes in high degree to the integrity and over-all physical properties of a nonwoven web.

There are also available equipments which feature the so-called "air lay" process which produce a fabric or web exhibiting a random distribution of fibers. The "air lay" type of equipment is restricted to a maximum fiber length of something in the order of 2.5 inches.

Virtually all nonwoven fabrics as produced today require the addition of certain binding agents in order to improve the cohesiveness of the web. Without these additives the web would have no integrity whatever and would fall apart with handling.

It is an important object of the invention to provide a nonwoven fabric or web consisting of randomly distributed fibers of varying lengths. Some of these fibers are sufficiently long so as to make contact with a large number of shorter filaments and by frictional engagement therewith tend to hold them in a fixed position with respect to adjacent fibers. This has a marked effect toward strengthening of the web structure.

Many of the fibers in the webs produced as set forth herein are less than 2 inches in length. There are, however, many fibers that exceed 2 inches and may reach 4 or more inches in length. It has been noticed that these longer fibers have a tendency to become entangled with other adjacent shorter fibers and produce a chain-linking effect. When this interconnection of fiber bundles is distributed throughout the web a demonstrable amount of inherent strength or integrity is realized.

It is a further object of the invention to provide means for converting continuous filamentous tow directly without the usual preliminary steps into a continuous web or sheet-like structure. Tow as used here implies a bundle of continuous filamentous fibers, more particularly a bundle of 75,000, more or less, filaments of 3 denier each, more or less. Elimination of the preliminary steps alluded to above is considered to be important since no pre-cutting of the tow into staple fiber lengths is necessary. The opening and separation of cut staple is also eliminated. Blending of two or more different staple lengths is still another step which is eliminated.

It is another object of the invention to provide a web having localized areas of reinforcements wherein the longer fibers make a partial or complete turn around other fibers and the longer of the fibers are found to extend from one localized area to another, thereby providing an internal network of connections between the localized areas which greatly increase the strength of the web.

It is another object of the invention to move the leading end of the tow into a flexing and/or rupturing zone in which the continuous filaments of the tow are subjected to rupturing forces applied at a high rate of speed, the effect of which is to produce discontinuous filaments which are thereafter condensed or collected on a conveyor.

It is another object of the invention to provide mechanism for rupturing continuous filaments of the tow into discontinuous fibers of varying lengths comprising rotating sets of beater blades which move the filaments first in one direction and then in the opposite direction and exert frictional wiping forces on the filaments in the direction in which they are fed to the zone. The beater blades have sharpened edges preferably notched or toothed which directly engage the filaments of the tow and move along them in a maner to cause the aforesaid rupturing.

The rotating blades create air drafts within the hopper in which the operation is carried out and part of the air currents which are induced by the blades have a tendency to move some of the fibers back into the zone where they might become entangled with other fibers in such a way as to create new entanglements. It is a further object of the invention to utilize the air currents created by the blades to produce the aforesaid new entanglements.

In the art of producing nonwoven webs it is common practice to blow cut staple fibers against a perforated conveyor by a pneumatic system employing a blower. It is found that the sets of blades already mentioned, when turning at a high rate of speed, create air currents which move the broken off fibers toward the conveyor. A blower system is shown in the drawings but it is not depended on solely for condensing of the fibers. It is a further object of the invention to provide beater blades which not only rupture fibers from the filaments, but also direct them toward the conveyor.

It is a further object of the invention to provide a hopper having a side which is inclined towards the conveyor and in the direction in which the latter moves. This inclined side is located in such position that at least some of the fibers will be directed against it and will slide along it toward the conveyor under pneumatic action and be deposited transversely of the length of the web.

The tow should be fed to the aforementioned zone preferably at a uniform rate and at the same time be subject to sufficient holding force to prevent the beater blades from advancing the filaments as a whole faster than this rate. It is accordingly a further object of the invention to provide feed rolls at least one of which will have a deformable surface, as of rubber, providing means for adjusting the distances between the rolls to cause the latter to exert enough holding force on the tow to resist forward feeding forces directed against it by the beater blades.

It has been found that for best operating conditions with a given tow, such as 3 denier/filament viscose tow, there is a relationship between the rate of feed of the tow and the number of impacts which the beater blades exert on it. Thus, for instance, for each inch of feed of the tow it is desirable that the number of beating actions by the blades be from 3,000 to 5,000 beats during feeding and application of said forces. The faster the beater blades rotate relative to the feed rolls, the shorter will be the fibers which are disengaged from the tow. If, on the other hand, the beater blades turn slower with respect to the feed, then some of the fibers will form unbroken tails that will ultimately reach the conveyor. It is another object of the invention to provide means to adjust the speed of rotation of the feed rolls and also the rate of rotation of the sets of beater blades to enable the invention to produce fibers of the desired average length.

The invention here described can be termed as an in herently noncritical operation in that the mechanism is in no way limited to a particular fiber length or denier. The several controllable elements are of a basically simple nature and slight deviations from any set of control conditions does not seriously affect the final product.

Figure 2:
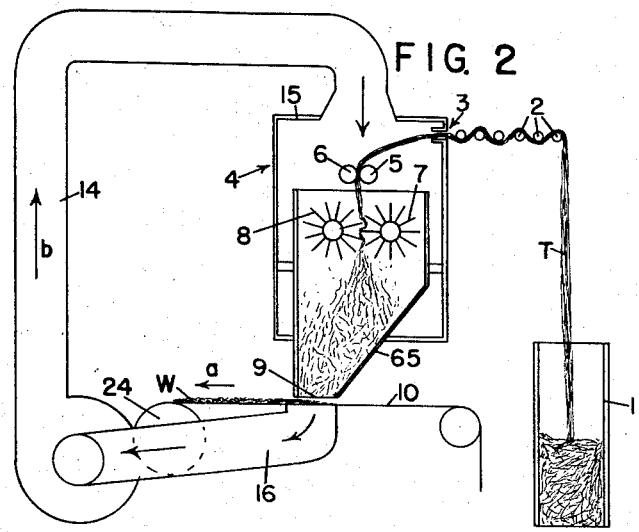
Figure 9:
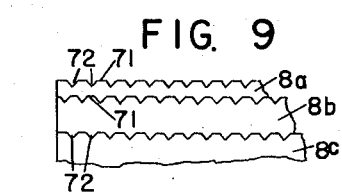
Figure 4:
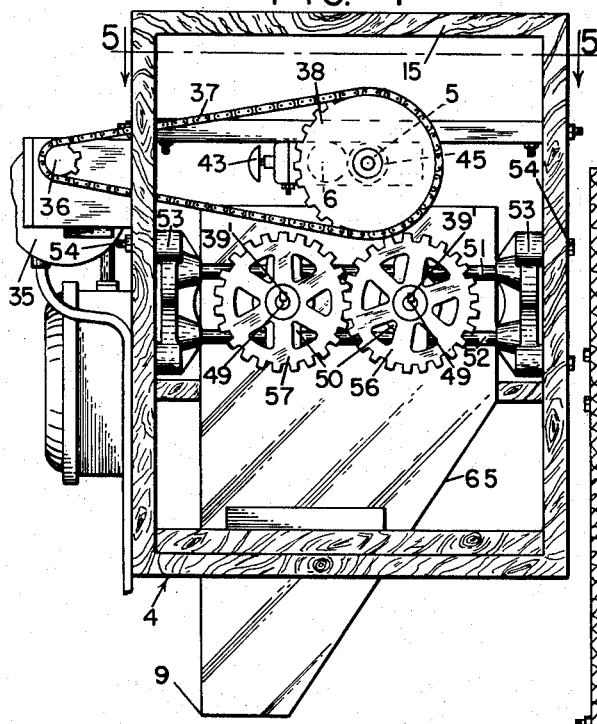
Figure 5:
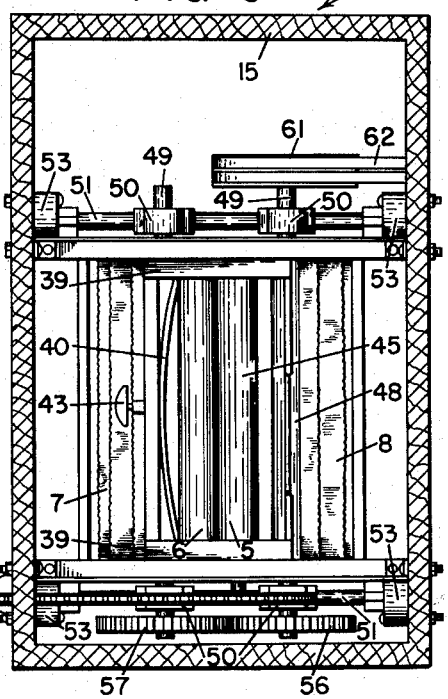
Figure 6:
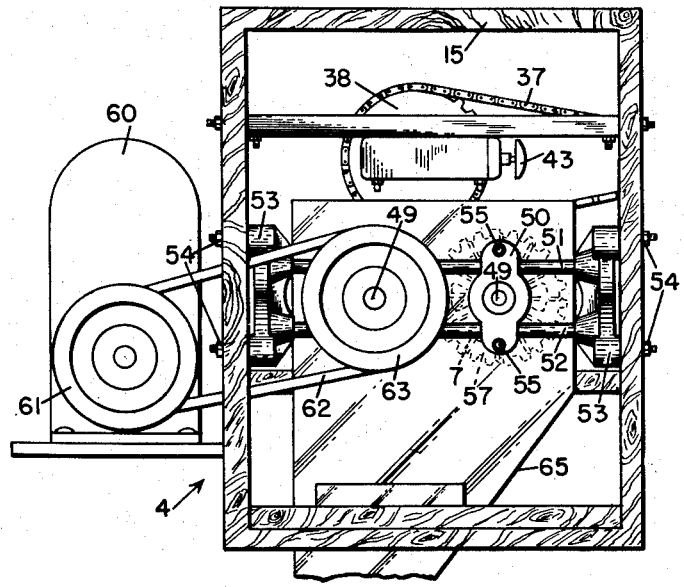
Figure 8:
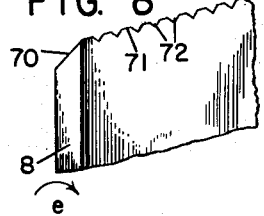
Figure 12:
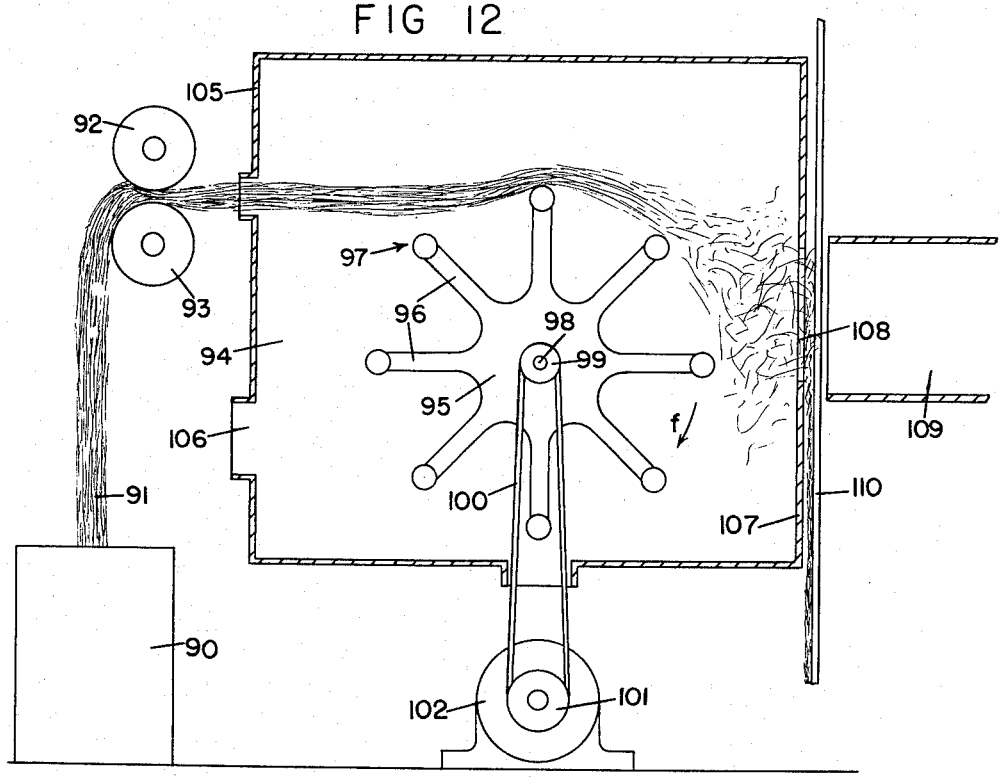
Figure 10:
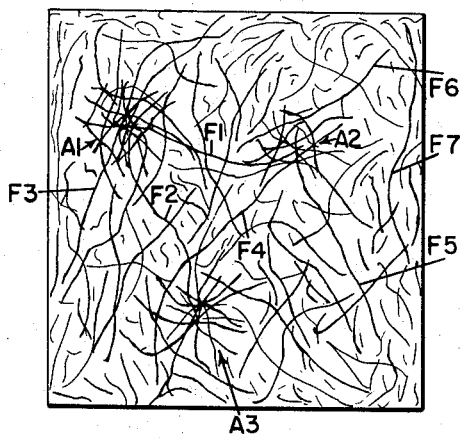
Figure 11:
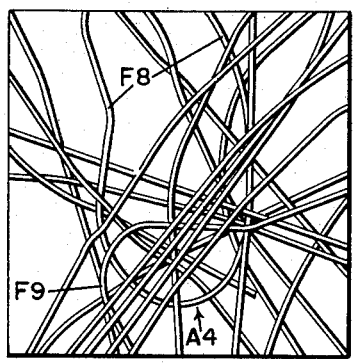
Figure 13:
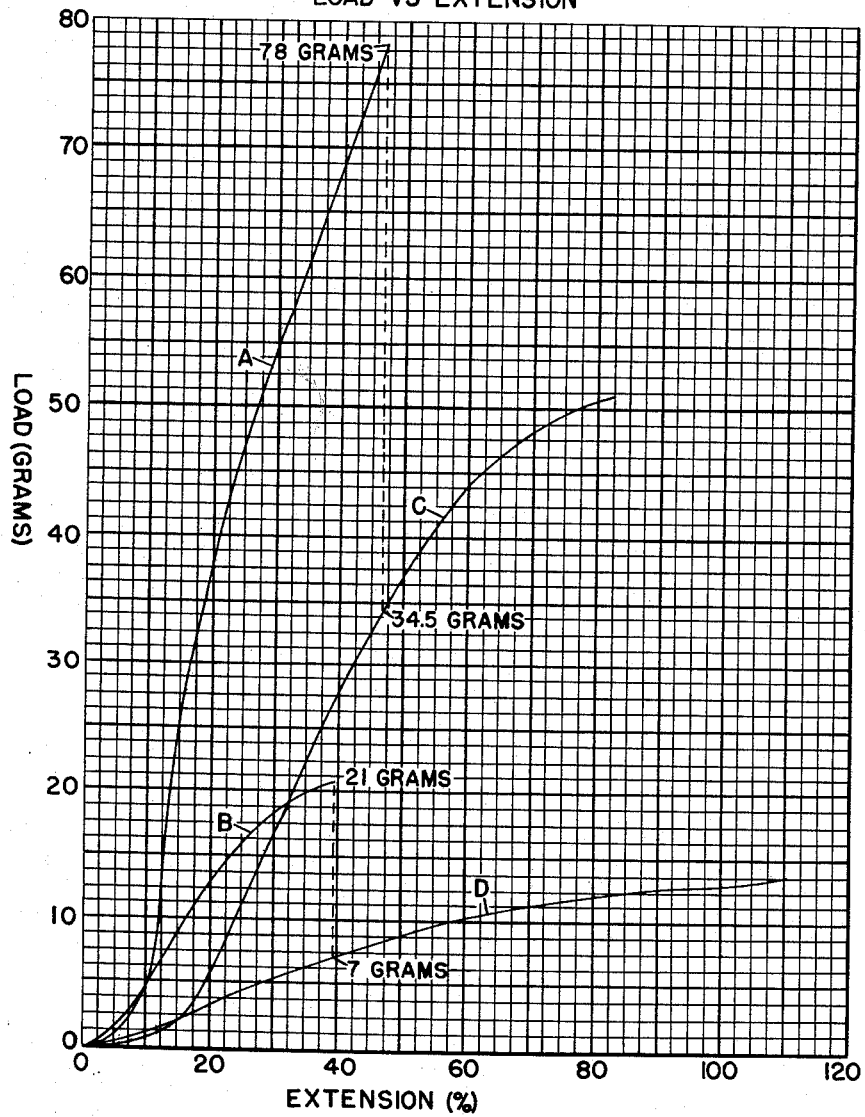

In order that the invention may be clearly understood reference is made to the accompanying drawings which illustrate by way of example two embodiments of the invention and in which:

FIG. 1 is a side elevation of a machine designed and built according to the present invention and adapted to carry out the aforesaid method for the production of a web having the previously mentioned characteristics, FIG. 2 is a diagrammatic view of a portion of FIG. 1, showing the interior of the hopper, the tow feed, the two sets of blades, the previously mentioned inclined surface of the hopper, and the conveyor, FIG. 3 is a plan view of the structure shown in FIG. 1, FIG. 3A is a detail vertical section on line 3A—3A, FIG. 3, FIG. 4 is an enlarged view of a part of FIG. 1 having the hopper door opened to show the interior of the mechanism, such as the gearing for the sets of blades and the drive for the feed rolls, FIG. 5 is a horizontal section on line 5—5, FIG. 4, FIG. 6 is a view somewhat similar to FIG. 4 but shows the structure as viewed from the opposite side of the hopper, FIG. 7 is a detailed view showing the two sets of beater blades and the cylinders on which they are mounted and the manner in which their paths intersect, FIG. 8 is a detail perspective of part of one of the beater blades on an enlarged scale, FIG. 9 is a diagrammatic view showing the edges of adjacent blades, FIG. 10 shows diagrammatically how longer fibers join local areas of grouped shorter fibers, FIG. 11 is a magnified view of fibers forming one of the aforesaid areas of reenforcement, FIG. 12 shows partly in diagram a modified form of tow to web machine, and FIG. 13 is a graph showing the tensile strengths of webs made according to the present invention compared with other known webs.

Referring particularly to FIGS. 1 and 2, the tow supplied from a can 1 and may be either uncrimped or crimped and is drawn over and under rods 2 as indicated in FIG. 2 and then passes through an inlet 3 into a hopper designated generally at 4. The tow will have many thousands of fine filaments and the effect of the bars 2 is to tend to spread them and produce some tension on the filaments. In the practice of the invention it may be desirable occasionally to direct a blast of air at the tow just below the bars to insure an initial separation of the filaments.

The tow then goes between right and left feed rolls 5 and 6, FIG. 2, which are turned by means to be described and then passes down between right and left-hand sets of beater blades 7 and 8 respectively through an operating zone where the continuous filaments are broken up into discontinuous fibers. The fibers are then blown down out of the bottom 9 of the hopper onto a pervious conveyor 10. As contemplated in FIG. 2, the conveyor will move to the left in the direction of arrow $a$.

The machine is equipped with a pneumatic system including a pump 12 which has the effect of forcing air upwardly as indicated by arrow $b$ through a pipe 14 and into the top 15 of the hopper, then downwardly through the hopper and conveyor to a return pipe 16 under the conveyor and thence back to the pump. When the latter is in operation there is a constant stream of air coming into the top of the hopper and blown out of the bottom and assisting in depositing the fibers onto the conveyor.

Referring more particularly to FIGS. 1, 2 and 3, a table 20 supports a preferably direct current motor 21 operatively connected to a sprocket wheel 22 through a speed changer 23. Wheel 22 drives a drum 24 around which the conveyor 10 is trained. Motor 21 can be controlled electrically in any approved manner by switches or the like not shown herein. The speed changer 23 affords means for varying the linear rate of travel of the conveyor.

Also mounted on the table 20 is a preferably alternating current motor 25 which by coupling 26 is connected to a direct current generator 27 having a lead 28 extending to a control box 29 which includes a rheostat (not shown). A power cable 30 from a source indicated generally at 31 feeds electric power through the box 29 to the alternating current motor via line 32.

A feed electric cable 33 leads from the box 29 to a motor 35 suitably mounted on the hopper 4. This motor has a small sprocket 36 to drive a chain 37 which, as shown in FIG. 4, drives a sprocket wheel 38 secured to feed roll 5 rotatable in bearings 39 mounted on the interior of the hopper. The feed roll 6 has direct frictional contact with the feed roll 5 and is mounted so that the pressure between the rolls 5 and 6 can be varied by pressure of a leaf spring 40 adjustable by hand grip 43. One of these rolls, namely 5 as shown herein, has a peripheral coating 45 of soft deformable material, such as rubber, the deformation of which can be altered by changing the distances between the rolls 5 and 6 for the purpose of increasing or decreasing the frictional grip which the roll 5 has on the tow. The rheostat in box 29 provides means for varying the speed of motor 35 so that the rate of turning of the feed rolls can be varied to give the desired feed of the tow.

Motor 21 is supplied with direct current from rectifier 27 through cable 17 leading to a resistance box 18 for the field of motor 21. A lever 19 pivoted with respect to table 20 engages a cam 34 driven by a worm wheel 42A meshing with a worm 42 which is driven by meshing bevel gears 42B and 42C powered by motor 25. As the latter turns the cam causes arm 19 to rock to change the resistance 18 in series with the field of motor 21 to vary its speed, see FIGS. 3 and 3A.

The sets of beater blades are mounted as shown in FIG. 7, each set being on a cylinder 48 mounted on a shaft 49 turning in bearings 50, see FIG. 5. The bearings at each end of the cylinders are mounted on two horizontal rods 51 and 52 which are held in fixed position by supports 53 secured at 54 to the hopper. By means of adjusting and holding screws 55 the bearings 50 can be slid along the rods 51 and 52. The right and left-hand shafts 49, FIG. 4, are operatively connected by equal gears 56 and 57 respectively which are keyed at 39' to their shafts and mesh to cause the cylinders 48 and their blades to rotate in unison in opposite directions. The cylinders are keyed at 41 to their shafts 49 in such a relation that the blades of one cylinder will enter spaces between the blades of the other cylinder to preserve the registry shown in FIG. 7.

The cylinders 48 are rotated by an electric motor 60 supported on the hopper 4 and connected by a pulley 61 and belt 62 to a pulley 63 fast on one of the shafts 49. The motor 60 can be controlled in any approved manner by a switch or the like and provision is made for changing the rate of drive of the cylinders 48 with respect to the motor 60. In the present instance this change is afforded by making the pulleys 61 and 63 of the Reeves, or expanding and contracting type, thus enabling the cylinders 48 to be rotated faster or slower, as the case may be.

In the operation of the mechanism thus far described the rate of feed of the tow T, rotation of the sets of blades 7 and 8 and their amount of overlap and the rate of travel of the conveyor belt having been determined, all of the motors will be set in operation. The feed rolls will draw the tow from can 1 and advance it downwardly between the two sets of beater blades. At this time the pneumatic system controlled by the pump 12 will be in operation so that air will enter the hopper from above and will be leaving it from below and return to the pump via pipe 16.

As the beater blades rotate the tow filaments between the two sets are fixed first in one direction as to the left of F1, FIG. 7, then in the opposite direction as at F2, then again to the left, as at F3, etc. The filaments adjacent to and between F1—F3 may be considered as the leading end portion of the tow. The blades will be turning at a high rate of speed and each filament will be subjected to a large number of flexings as well as beatings during the time it is in position to be engaged by the blades. As shown in FIG. 7, the paths traversed by the edges of the left-hand set of blades is indicated by the arc $c$, while the similar edges of the right-hand set of blades move along a path indicated by the arc $d$. The area Z between the intersections of these two arcs may be considered as the approximate operating zone in which the filaments of the leading end portion of the tow are subjected to their alternate flexings as well as the frictional forces which cause some of the fibers to be separated from the leading end portion.

It is found that the alternate paths of the tow filaments first in one direction and then the other results in breaking them into fibers having various lengths and as the fibers are broken off they are blown downwardly by a draft of air created by the blades as they rotate. In one instance in which the invention has been operated the cylinders 48 were rotated at 1500 r.p.m. and the feed rolls were turned at a rate to feed 12 inches of tow per minute.

The hopper is provided with an inclined fiber deflector wall 65 which is slanted downwardly and in the direction of feed of the conveyor as shown for instance in FIG. 2. Many of the fibers which are broken off from the filamentous tow will be blown against this inclined wall and will tend to straighten out in a direction transverse of the feed of the conveyor so that when they emerge from the mouth 9 they will be incorporated into the web W transverse of its length. Many other of the fibers will be oriented lengthwise of the web while still other fibers will be deposited at random angles. Durign the operation of the machine the web will be delivered to the left from the mouth 9 as viewed in FIG. 2 and convenient lifter means (not shown) may be employed to remove the web from the conveyor 10.

An important feature of the invention is the ratio between the rate of feed of the tow to the operating zone and the number of beatings to which the filaments will be subjected while in the zone. In one instance it was found desirable to subject the filaments to from 3,000 to 5,000 beatings per inch of feed of the tow toward the operating zone. Twenty-four blades were used, 12 on each cylinder 48, as shown in FIG. 7. The invention is not limited, however, to this number of blades. From an inspection of FIG. 7, it will be seen that the leading end portion of the tow in zone Z is subjected simultaneously to beatings, flexings, and frictional wiping forces to rupture the continuous filaments into discontinuous fibers and to effect separation of the latter from said continuous filaments. In this instance, zone Z may be considered as a multi-stage operating zone where multiple operations are performed on the leading end portion.

FIGS. 8 and 9 show details of the edges of the beater blades which strike the filaments. FIG. 8 shows part of a blade which moves in the direction of arrow $e$. The edge of the blade is beveled as at 70 and has a sharp edge 71 which is interrupted by notches 72. These notches are V-shaped preferably with edges that come together at a point rather than being blunt at their lower ends. In the machine as built the notches were about 1/16 inch apart and 1/32 inch deep, and their sides were sharp.

FIG. 9 shows one arrangement of notches which can be used on adjacent blades. Blades 8a and 8c can have their notches more or less aligned circumferentially in register with the cutting edges 71 of blade 8b. Each blade will thus hold a group of filaments in a notch aligned with a cutting edge of an adjacent blade. FIG. 9 shows the blades on one of the cylinders 48 but a similar arrangement can be employed for both sets of blades, and if desired a blade 7 can have its notches aligned with cutting edges on the next blade 8 to engage the filaments. The blades are preferably made of tempered steel and are imperforate so that they are capable of moving streams of air to blow fibers downwardly towards the conveyor.

Another form of the machine which can be utilized to produce the web is shown in FIG. 12 and comprises can 90 from which a tow 91 is fed by top and bottom rolls 92 and 93 respectively into a box or chamber 94 in which is rotatably mounted a spider wheel 95. This wheel in effect has rods or the like 96 which have abrasive tips made of crystals or hardened steel or carbide elements designated generally at 97. The wheel is mounted on a shaft 98 and is driven by means of a sprocket 99, chain 100, sprocket 101, and motor 102.

The left wall 105 of the box 94 as shown in FIG. 12 has an air inlet passage 106 and the right-hand wall 107 has an outlet passage 108 which communicates with a suction device 109. A screen 110 passes downwardly to the right of the outlet 108 and mechanism not shown is provided for driving the screen downwardly to a take-off device where the web on it can be scraped away from the screen or conveyor.

In the operation of the form of the machine shown in FIG. 12 the motor drives the spider wheel 95 at a fairly low rate of speed such as 500 r.p.m., and the tow lies over the wheel so that the bars 96 ride up under it as the wheel turns in the direction of arrow $f$. Because of the friction of the abrasive tips and the fact that the feed rolls 92 and 93 restrain movement of the tow into the box 94, permitting it to travel about at the same rate as do rolls 5 and 6, of the form shown in FIG. 5, the abrasive tips will break off fibers from the filaments of the tow and they will collect on the screen after being drawn pneumatically through the opening 108.

The sets of blades shown in FIG. 2 and the spider wheel shown in FIG. 12 can be used for purposes other than converting filaments into fibers, such as napping and softening a comparatively stiff sheet material, such as leather or woven goods. Such material can be fed between feed rolls 92 and 93, FIG. 12, and led over the spider wheel and then out of opening 108 by suction onto the conveyor 110. The abrasive tips will nap the under side of the material and the repeated beating by the bars will soften it. If the material were fed between feed rolls 5 and 6 to the zone Z, FIG. 7, the beater blades would nap both sides and also soften the material.

The web made by the procedure set forth herein is characterized by two features which give it elasticity, cohesiveness and strength. One of these features is the presence in the web of a large percentage of fibers over 3 inches in length. In the sample count made of a web made as described herein, the numbers of fibers of each of several different lengths were found to be as follows:

| Length, inches | ½ | 1 | 1½ | 2 | 2½ | 3 | 3½ | 4 | 4½ | 5 |
|---|---|---|---|---|---|---|---|---|---|---|
| Number | 1 | 10 | 6 | 10 | 5 | 6 | 15 | 12 | 6 | 8 |

Another feature of the web is the large number of localized areas A of reenforcing entanglements of the various fibers, many of the areas of entanglement including several log fibers which join and frictionally engage and radiate from the areas into other parts of the web. The strength growing out of these areas is due to the long fibers many of which are entangled with two or more of the localized areas. FIG. 10 indicates diagrammatically how the fibers are interconnected to form these localized areas of concentration and how some of the fibers are of sufficient length to connect two or more areas.

Samples of the web made as set forth herein have been subjected to bursting tests on the Ashton Burst Tester No. 98 such as shown for instance in Patent No. 2,727,386. This tester has a rubber diaphragm over which the test specimen is placed and clamped at its edges. Then hydraulic pressure under the diaphragm lifts the part of the web over it until the specimen bursts. In the test the subject web was compared with two other well-known webs commercially available, with the following results:

A single web made according to the invention weighing 35 grams per square yard was found to withstand a pressure of from 10 to 18 pounds per square inch, eight tests showing seven specimens nearer 10 pounds and one reaching 18 pounds. A first comparative web weighing 100 grams per square yard withstood pressures of 4 to 5 pounds per square inch, 6 tests being made, 5 of which were in the 4 to 4½ pound range and one of which reached 5 pounds. In a second comparative web weighing 60 grams per square yard there was one test which ran to 5½ pounds per square inch and two to eight pounds per square inch. The end of the tests is indicated by the bursting of the specimen as the rubber diaphragm bulges upwardly under hydraulic pressure.

In the second bursting test each of the three webs was doubled and it was found that the web made according to the present invention was able to withstand the full pressure which the testing machine could exert, that is, 57 pounds per square inch, without bursting. The first of the comparative webs burst at 9 pounds per square inch and the second comparative web had one break at 19 pounds per square inch and one at 23½ pounds per square inch.

Thus, it will be seen that although the web made according to this invention weighed much less per square yard than the other two webs it showed a marked superiority in strength which is believed to be due to the two features already mentioned, that is, the relative high percentage of long fibers which could transmit resisting force over a considerable area, and the localized areas of reenforcement.

An Instron Tensile Tester was used to compare the load-extension relation for a web made as set forth herein and webs made by two prior well known methods. In each instance the specimen tested was 3″ x 3″ with the jaws of the tester moving apart at the rate of five inches per minute, the jaws gripping opposite edges of the specimen and being two and one-half inches apart at the beginning of the test. In each instance the material was three denier viscose. The results of the tests are shown on FIG. 13 where the ordinates are the load in grams and the abscissas are percent elongation.

Curve A, representing the instant web weighing 110 grams per square yard, shows an extension or stretch of 47% when the load was increased to 78 grams, whereas a web of well known make and equal weight, as shown by curve C, had an extension of 82% when the load was only 51 grams. Curve B, representing the instant web weighing 40 grams per square yard, shows stretch of 39% when the load was 21 grams. Curve D, on the other hand, showing results with another web of well known make and same weight, indicates an extension of 110% where the load was only 13½ grams.

From FIG. 13 it will be seen that a web made as set forth herein has more than twice the resistance to stretch under tension than other commercially available webs. Thus, the abscissa of curve C equal to that of the top of curve A corresponds to 34½ grams compared with 78 grams for curve A, and the abscissa of curve D corresponding to the top of curve B shows only one-third the resistance to stretch under tension as does the instant 40 gram web.

So far as the web itself is concerned, it can be made as described in connection with FIGS. 2 and 11, or it can be made by cutting fibers of different lengths in the percentages desired, and then mixed and pneumatically deposited on a conveyor.

Referring again to FIG. 10, it is believed that the local entanglements indicated at areas A1, A2 and A3 are produced in part at least by several crossed filaments being caught in a notch of the beater blades prior to rupture or between abrasive elements 97, FIG. 12, and all breaking at once in a group and descending to the conveyor. Longer fibers are then deposited across the groups and still other fibers pneumatically packed down on these groups of long fibers. The long fibers in many instances are entangled with two or more areas, and frequently encircle, or at least pass part way around, the areas of entanglement. These areas seem to provide anchorages for the long fibers, and the longer fibers in crossing from one area to another enhance considerably the over-all quality of the web.

A number of specimens of web made as set forth herein have been examined microscopically and all appear to have characteristics similar to those shown in FIGS. 10 and 11. In FIG. 10 only three localized areas A1, A2 and A3 are shown but it is to be understood that these areas are distributed throughout the web and in many instances two or more of these areas will be connected by long fibers. Thus, in FIG. 10 fiber F1 is entangled with area A1 and A2, fiber F2 is entangled with area A1 and A3, the fiber F3 passes through area A1 without becoming entangled with other areas but extends into the adjacent fabric far enough to establish considerable frictional resistance with adjacent fibers between the areas. It should be understood that in FIG. 10 a good many of the shorter fibers have been omitted for the sake of clearance. Fiber F4 extends from area A2 to the periphery of area A3, while fiber F5 is somewhat similar to fiber F3 in that it is anchored in one of the areas, namely, A2, and then has considerable holding frictional resistance with other fibers of the web. Fibers F6 and F7 are shown as representative of the positions occupied by certain of the long fibers, some of which, as F7, do not necessarily become entangled with any of the areas.

Referring to FIG. 11, which shows an enlargement of one area but considerably magnified, fiber F8 is seen to encircle the area A4 while fiber F9 extends through the area A4 and then bends downwardly to curve off toward another area not shown in FIG. 11.

So far as the lengths of the fibers which are ruptured from the tow are concerned, it may be stated that in general the length of the fiber is dependent upon the number of blows the filaments of the tow receive while they are in the operating zone Z. The specimens shown in FIGS. 10 and 11 were made under conditions in which the tow was fed in at the rate of 12 inches per minute and the cylinders of the beater blades rotated at approximately 1500 r.p.m. With 24 blades acting on the tow for approximately one inch it can be computed that each inch of the filaments was subjected to about 3,000 blows. It was found by experiment that the beater blades could be operated at a somewhat higher speed so that an upper range of 5,000 blows per inch of feed would give satisfactory results. The range from 3,000 to 5,000, however, is believed to be the optimum number of blows for the production of fibers of sufficient length to add considerable strength to the web. The materials used in the test were viscose, acetate, Dacron and nylon, the viscose apparently producing a web of somewhat better appearance than that made by the other fibers. It should be noted that the machine and method set forth herein can operate on any continuous filament or group of filaments, including natural silk, but that it is not very satisfactory with yarns made from natural fibers, such as cotton and wool. The fibers previously mentioned see column 6 line 65 are to be considered only a typical count and we do not wish to be limited to the numbers of fibers of different lengths given hereinbefore since there is some variation from part to part of the web although the general average of fibers will be approximately as already stated. The more blades that are on the cylinders 8 and 9 the shorter the fibers will be, provided the r.p.m. of the cylinders is about as already suggested. The higher the denier of the single filaments, that is, the greater the weight per unit length, the coarser or larger it is, the shorter the fibers in the web will be, due probably to greater brittleness.

Having now particularly described and ascertained the nature of the invention and in what manner the same is to be performed, what is claimed is:

1. The method of producing a web of intertangled fibers from a tow of continuous filaments consisting in the following steps: feeding the leading end portion of the tow at a given linear rate into a flexing zone, subjecting the leading end portion in the zone to frictional forces exerted within the zone only and directed away from the point of feeding and at rates in excess of said given rate to rupture the filaments in the zone into discontinuous fibers of various lengths, and causing the fibers to be separated from said leading end portion by said forces for random distribution onto a moving conveyor.

2. The method set forth in claim 1 wherein the forces are directed against opposite sides of the leading end portion simultaneously.

3. The method set forth in claim 1 wherein the forces are directed against the leading end portion from opposite sides thereof and move in intersecting arcuate paths to effect separation of said discontinuous fibers from said leading end portion.

4. The method set forth in claim 1 wherein the forces are wiping in nature and simultaneously produce several bends in the leading end portion, adjacent bends being in opposite directions.

5. The method set forth in claim 1 wherein a further step includes rapidly beating the leading end portion from opposite sides to rupture the filaments therein during said feeding and application of said forces.

6. The method of producing discontinuous fibers from the continuous filaments of a tow incident to forming a nonwoven web consisting in the following steps: feeding the leading end portion of the tow in a given direction at a given linear rate to a flexing zone, and subjecting the leading end portion of the tow while in the zone to frictional tensioning forces moving along the filaments in the leading end portion in said direction at a rate greater than said given rate to rupture the continuous filaments into discontinuous fibers and to effect separation of the latter from said continuous filaments.

7. The method set forth in claim 6 wherein the forces are exerted simultaneously on opposite sides of the leading end portion of the tow.

8. The method set forth in claim 6 wherein the forces produce reverse bends in the filaments in the leading end portion while they are in said zone.

9. The method set forth in claim 6 wherein the step of feeding prevents the tensioning forces from increasing the rate of travel of the filaments to the zone.

10. The method of producing discontinuous fibers from the lead end of continuous filaments of a tow incident to forming a nonwoven web consisting in the following steps: feeding the leading end of the tow in a given direction at a given linear rate to a multi-stage operating zone, and subjecting the leading end while in the zone simultaneously to beatings, flexings, and to frictional wiping forces moving along said end in said direction at a rate greater than said given rate to rupture the continuous filaments into discontinuous fibers and to cause separation of the latter from said continuous filaments.

References Cited in the file of this patent

UNITED STATES PATENTS

| | | |
|---|---|---|
| 1,555,865 | McConnell | Oct. 6, 1925 |
| 1,573,845 | Mason | Feb. 23, 1926 |
| 2,030,252 | Hale et al. | Feb. 11, 1936 |
| 2,416,390 | Hitt | Feb. 25, 1947 |
| 2,419,320 | Lohrke | Apr. 22, 1947 |
| 2,581,069 | Bertolet | Jan. 1, 1952 |
| 2,584,517 | Verreet | Feb. 5, 1952 |
| 2,641,027 | Taylor | June 9, 1953 |
| 2,641,028 | Steele | June 9, 1953 |
| 2,719,336 | Stotler | Oct. 4, 1955 |
| 2,863,176 | Labino | Dec. 9, 1958 |
| 2,926,417 | Duvall | Mar. 1, 1960 |
| 2,948,021 | Bailiff | Aug. 9, 1960 |

FOREIGN PATENTS

| | | |
|---|---|---|
| 890,411 | Germany | Sept. 17, 1953 |